United States Patent [19]
Pastorino

[11] Patent Number: 5,442,488
[45] Date of Patent: Aug. 15, 1995

[54] MAGNIFIED MIRROR

[76] Inventor: Anthony T. Pastorino, 147 35 W. River Rd., Inglis, Fla. 32649

[21] Appl. No.: 806,674

[22] Filed: Dec. 13, 1991

[51] Int. Cl.6 .................... G02B 27/02; G02B 7/182
[52] U.S. Cl. .................... 359/802; 359/803; 359/829; 359/869; 359/882; 362/135
[58] Field of Search ............... 359/802, 811, 817–819, 359/838, 867, 869, 879, 882, 803, 881, 871, 872, 829, 727; 248/466, 469, 471, 475.1; 362/135

[56] References Cited

U.S. PATENT DOCUMENTS

| | | | |
|---|---|---|---|
| 574,588 | 1/1897 | Thorp | 359/802 |
| 594,495 | 11/1897 | Spohn | 359/802 |
| 936,344 | 10/1909 | Myers . | |
| 1,513,734 | 11/1924 | Beatty | 359/871 |
| 2,163,001 | 6/1939 | Komorous | 88/102 |
| 2,584,829 | 2/1952 | Barnes | 88/102 |
| 2,817,998 | 12/1957 | Neiuwenhoven | 88/57 |
| 2,861,501 | 11/1958 | Strelakos | 359/802 |
| 3,374,047 | 3/1968 | Gatchell | 359/817 |
| 3,677,620 | 7/1972 | Bettencourt . | |
| 3,751,140 | 8/1973 | Berlin et al. | 248/481 |
| 3,936,156 | 2/1976 | Shaw et al. | 359/804 |
| 3,955,884 | 5/1976 | Pesco | 359/817 |
| 3,970,369 | 7/1976 | Wachsman | 359/732 |
| 4,958,913 | 9/1990 | Schaffer | 359/819 |
| 5,087,112 | 2/1992 | Feinbloom | 359/802 |

Primary Examiner—Loha Ben
Assistant Examiner—James Phan
Attorney, Agent, or Firm—McAulay Fisher Nissen Goldberg & Kiel

[57] ABSTRACT

A magnified mirror assembly has a frame, a mirror disposed along an edge of the frame and a centrally disposed magnifying lens which provides magnification of a reflected image. Such a magnified mirror is particularly useful in the application of make-up, the examination of the skin for cleansing, treating blemishes, removing blackheads and pimples and provides a means for producing increased image magnification with limited distortion at close range.

63 Claims, 3 Drawing Sheets

MAGNIFIED MIRROR

TECHNICAL FIELD

This invention relates to mirrors and more particularly to a magnified mirror for enhanced viewing of the face.

BACKGROUND

Mirrors are typically used in either hand held or mounted form to assist in applying make-up, inspecting the face and the eyes, etc. It is especially desirable to use a mirror in close proximity and with a certain degree of magnification to assure proper execution of detailed procedures such as application of make-up, removing hair or treating blemishes.

It is known to provide a hand held or stand-mounted mirror which provides a normal sized mirror reflection on one side having a mirrored surface on the other side which provides a magnified reflection. However, the degree of magnification is limited by the physical construction of the mirror. As magnification increases in such a mirror, substantial distortion is encountered. Also, as one moves closer to the magnifying mirror surface, the degree of magnification decreases.

In U.S. Pat. No. 3,751,140, a combination of magnifying and non-magnifying mirrors are used for close-up viewing of the eyes and face. However, no means are provided for producing a higher degree of magnification for example, by the use of a lens. The invention concerns orienting the mirrors to provide images to the viewer from different angles of perspective.

In U.S. Pat. No. 2,817,998, a mirror camera has an objective formed by a concave mirror to which one or more correcting elements are added. The camera additionally incorporates means to prevent distortion of the mirror through impact or shock damage. The mirror camera utilizes a concave mirror with a meniscus shaped lens as a correcting element. There is no description of the utilization of a mirror with a magnifying lens for providing magnified viewing of a reflection for personal use.

U.S. Pat. No. 2,584,829, discloses a hand mirror and supporting handle which incorporates a closure cap to protect the mirror faces.

SUMMARY OF THE INVENTION

It is an object of the present invention to provide a magnified mirror image reflection which provides enhanced viewing.

It is a further object to provide a magnified mirror assembly in hand held form, stand mounted or illuminated.

It is a further object to provide a magnified mirror assembly of simple construction.

These and other objects of the present invention are achieved by providing a magnified mirror assembly comprising a mirror and a magnifying lens disposed adjacent thereto. The mirror and lens are preferably mounted in a frame with the lens closely adjacent to the mirror. The lens provides a high degree of magnification of a reflected image and can be ground to yield a predictable increase in the power of magnification. Such an assembly provides high magnification at close range with limited distortion.

DETAILED DESCRIPTION OF THE INVENTION

Figure 1:
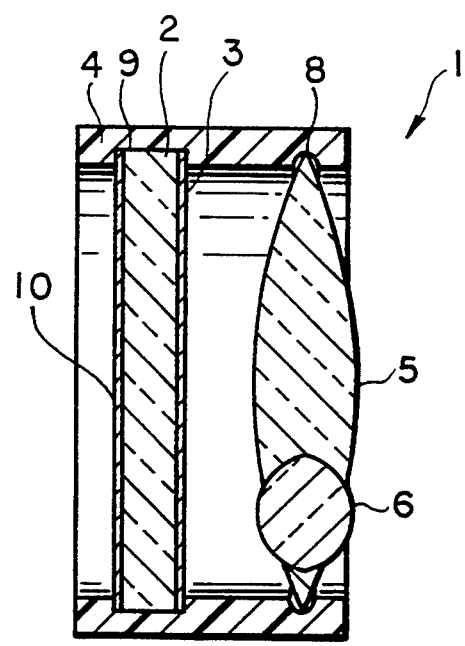
FIG. 1 shows the magnified mirror of the invention in cross-section.

Referring to FIG. 1, a magnified mirror assembly 1 has a plate 2 having a mirrored surface 3 mounted in a frame 4. A magnifying lens 5 is also mounted in the frame adjacent to the mirror, preferably in close proximity on the order of about 0.25" center to center. The lens may be located at a spacing of from about 0.01–1.0" from the mirror. The high point of the lens may contact the mirror. The distance does not substantially affect the magnified image and a narrower spacing is preferred to provide a streamlined assembly.

Any type of mirror or mirrored surface can be used in the invention. The mirror in FIG. 1 is a conventional normal imaging mirror made of glass or plastic or is a magnifying mirror. Either type mirror could be used in the invention to further enhance the image reflection.

The magnifying lens may be composed of glass or plastic and is ground or formed to provide a particular degree of magnification. For example, a magnifying lens which gives a power of magnification of from about $2\times$ to $12\times$ times the normal image, may be used. Of course, the range of magnification can vary depending on the particular application of the mirror and personal preferences. Of course, the greater the power of magnification, the more limited the field and some tradeoffs in lens selection must be made. However, it is possible to enhance the utilization of the mirror by incorporating a second magnifying lens 6 of higher strength within the initial magnifying lens to provide an area where two or three times the first magnification can be achieved. For example, the lens 5 has a magnification power of $3\times$ and the second magnifying lens 6 incorporated therein provides a magnification power of $5\times$. Thus, if one area requires a higher degree of magnification, viewing can be undertaken through the increased magnification portion.

Figure 2:
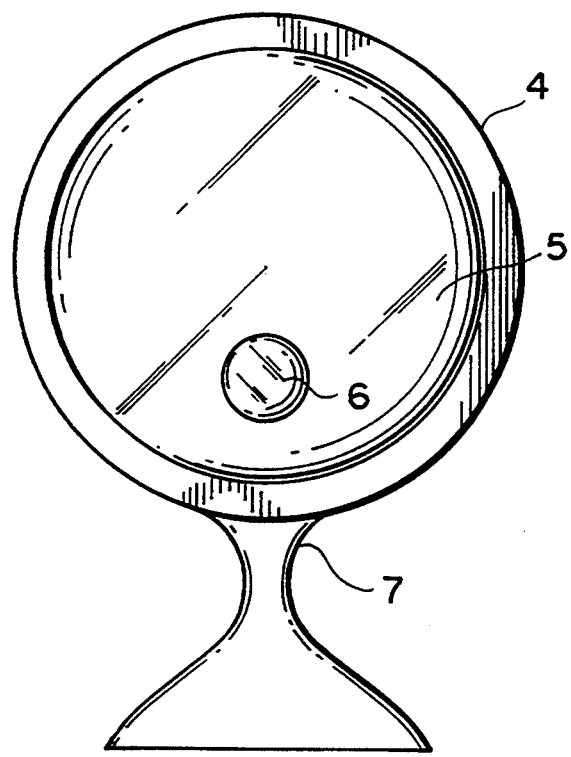
FIG. 2 shows the magnified mirror of FIG. 1 in a front view.

The frame 4 is preferably made of plastic but can be made of any suitable material. Typically, a handle 7 would be integral with the frame, for example, as shown in FIG. 2. Of course, the assembly is preferably mounted on a stand for hand-free use. Referring still to FIG. 1, the frame 4 has a circumferential groove 8 for mounting the lens therein and a groove 9 for mounting the mirror. However, various constructions can be used for mounting the mirror and lens in combination. The embodiment shown in FIG. 1 is a sealed unit to prevent condensation or the invasion of dirt between the mirror and lens. Of course, the lens and mirror can be mounted in a frame which facilitates disassembly for cleaning as will be described below. The plate 2 additionally has a mirrored surface 10 to provide a normal sized reflection, or conventional magnifying mirror if desired.

Figure 3:
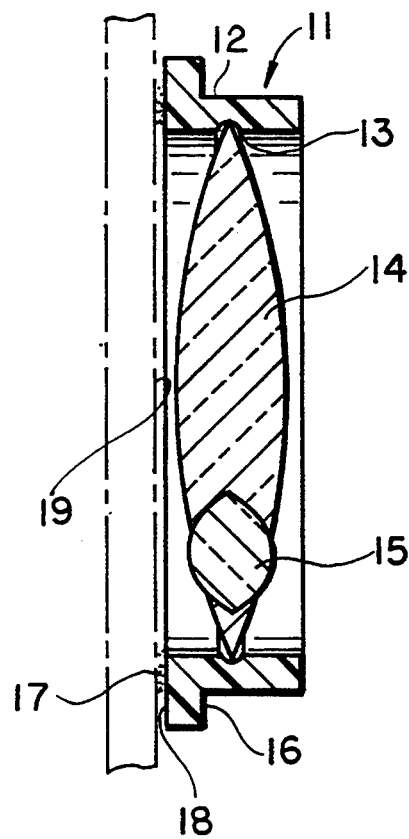
FIG. 3 shows the an alternative embodiment of the invention for mounting on an existing mirror.

Referring to FIG. 3, an alternative embodiment of the present invention is shown. A magnified mirror assembly 11 has a frame 12 incorporating a groove 13 for mounting a lens 14 therein. The magnifying lens may be as previously described and optionally includes an increased magnification portion 15. However, the frame 12 has a lip 16, which extends perpendicular to and surrounds the frame. This lip preferably has an adhesive or other means 17, located on a surface 18 for attaching the frame directly onto an existing mirror 19. For example, a medicine cabinet mirror could have the assembly 11 bonded to a portion thereof and thus the person viewing would have the options of observing a normal reflection in the unmagnified mirror, or enhanced viewing through the assembly. Consequently, the device of the present invention can be provided in kit form for later mounting to a mirror. The assembly could also be attached to an existing hand held or stand mounted mirror.

Figure 4:
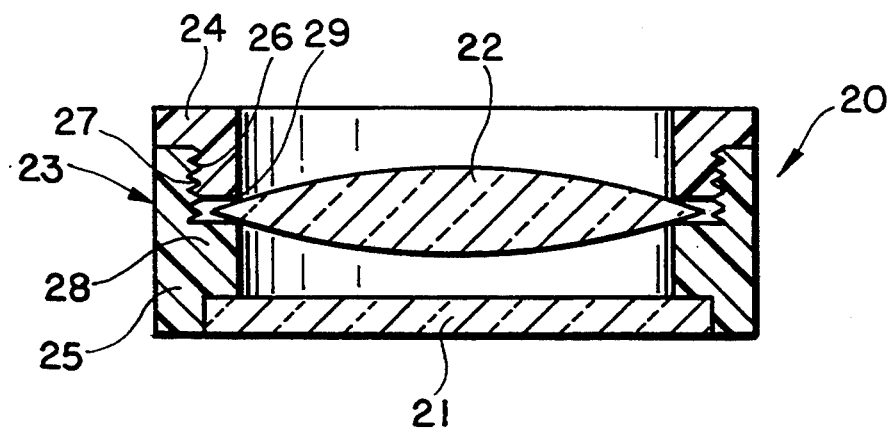
FIG. 4 is an alternative embodiment of the invention using a threaded frame assembly.

Referring to FIG. 4, a magnified mirror assembly 20 has a mirror 21 and a magnifying lens 22 mounted in a frame 23. The frame has an upper portion 24 and a lower portion 25 joined by mating threaded surfaces 26 and 27 respectively. The lower portion 25 has the mirror 21 mounted therein and includes a shoulder 28 upon which the lens rests. The upper portion has a lip 29 which engages the lens to lock it in the assembly. This embodiment allows disassembly for cleaning or to change the lens to increase or decrease magnification.

Figure 5:
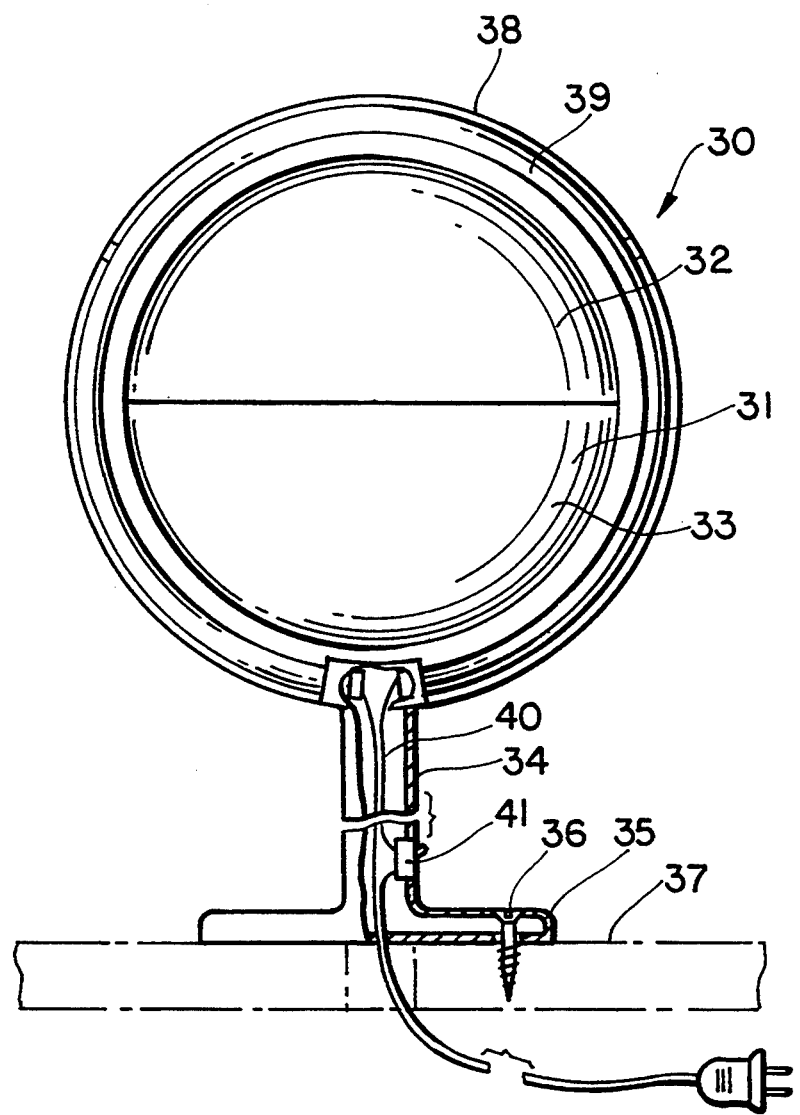
FIG. 5 is an alternative embodiment of the invention using a bifocal magnifying lens and ring illumination.

Referring to FIG. 5, a magnified mirror assembly 30 has a bifocal lens 31 with an upper portion 32 of a first power of magnification and a lower portion 33 of a second power of magnification. This is a alternative to the lens of FIG. 1, providing a larger area for image reflection magnification. The assembly 30 is supported by a column 34 attached to a base 35. base 35 is attached by screws 36 to a mounting surface 37. Of course, any type of stand mounting could be used.

Referring still to FIG. 5, the assembly 30 has a frame 38 upon which is mounted a light source 39. For example, a fluorescent or incandescent bulb could be used. The source 39 is connected by wires 40 to a switch 41 and to a power supply (not shown). The addition of an illumination source on the frame increases and enhances the light reflection image to enhance the utility of the mirror assembly. Of course, other means of illumination, such as an attached spot light, could also be used.

Utilizing the magnified mirror assembly of the present invention provides substantially enhanced viewing of the face and eye area which is particularly advantageous for treatment of skin blemishes, blackheads, and pimples and for the application of make-up. The invention utilizes a lens to magnify the reflected image, rather than relying on modification of the mirror surface to magnify the reflected image. This allows high magnification to be achieved at close range. The magnification can also be determined by utilizing a particular lens and is not limited by mirror construction. The provision of the magnified mirror assembly in a plastic frame using a normal image or magnifying mirror and ground lens provides a greatly enhanced image as an alternative to existing magnifying mirrors.

While preferred embodiments of the present invention have been shown and described, it will be understood by those skilled in the art that various changes or modifications could be made without varying from the scope of the present invention. For example, the mirror and lens could be made as a unitary structure.

I claim:

1. A magnified mirror assembly comprising:
  a frame, a first image reflecting surface mounted on said frame and a magnifying lens disposed within said frame and fixedly located adjacent to said image reflecting surface to produce a magnified reflected image, wherein the first image reflecting surface is a magnifying mirror which provides a magnified image reflection, the frame having a pair of groove means, the first image reflecting surface disposed in one groove means and the magnifying lens disposed in another groove means.

2. The magnified mirror assembly of claim 1 wherein the lens is disposed at about 0.01–1.0 inch from the first image reflecting surface.

3. The magnified mirror assembly of claim 1 further comprising a handle which extends from the frame.

4. The magnified mirror assembly of claim 1 wherein the frame is made of plastic.

5. The magnified mirror assembly of claim 1 wherein the magnifying lens provides an image magnification power of from 2× to 12×.

6. The magnified mirror assembly of claim 1 wherein the magnifying lens provides an image magnification power of 3×.

7. The magnified mirror assembly of claim 1 wherein the magnifying lens has one or more increased magnifying portions for providing an increased power of magnification of the reflected image.

8. The magnified mirror assembly of claim 1 further comprising a second image reflecting surface on an opposite side of the first image reflecting surface.

9. The magnified mirror assembly of claim 1 further comprising stand means for locating the assembly on a mounting surface.

10. The magnified mirror assembly of claim 9 wherein the stand means comprise a column extending from the frame and a base disposed at an end of the column which rests on the mounting surface.

11. The magnified mirror assembly of claim 1 wherein the lens is disposed at about 0.01–0.25 inch from the first image reflecting surface.

12. The magnified mirror assembly of claim 1 wherein the frame has an upper portion, a lower portion and means to attach the portions to each other.

13. The magnified mirror assembly of claim 12 wherein the attachment means comprise mating threaded surfaces.

14. The magnified mirror assembly of claim 12 further comprising a shoulder in the lower portion for supporting the lens thereon.

15. The magnified mirror assembly of claim 1 further comprising illumination means disposed on the frame.

16. The magnified mirror assembly of claim 1 wherein the magnifying lens is a bifocal lens.

17. A magnified mirror assembly comprising:
  a frame, a first image reflecting surface mounted on said frame and a magnifying lens disposed within said frame and fixedly located adjacent to said image reflecting surface to produce a magnified reflected image, wherein the first image reflecting surface is a magnifying mirror which provides a magnified image reflection, the magnifying lens having one or more increased magnifying portions for providing an increased power of magnification of the reflected image.

18. The magnified mirror assembly of claim 17 wherein the lens is disposed at about 0.01–1.0 inch from the first image reflecting surface.

19. The magnified mirror assembly of claim 17 further comprising a handle which extends from the frame.

20. The magnified mirror assembly of claim 17 wherein the frame is made of plastic.

21. The magnified mirror assembly of claim 17 wherein the magnifying lens provides an image magnification power of from 2× to 12×.

22. The magnified mirror assembly of claim 17 wherein the magnifying lens provides an image magnification power of 3×.

23. The magnified mirror assembly of claim 17 wherein the frame has a pair of circumferential grooves, the first image reflecting surface disposed in one groove and the magnifying lens disposed in another groove.

24. The magnified mirror assembly of claim 17 further comprising a second image reflecting surface on an opposite side of the first image reflecting surface.

25. The magnified mirror assembly of claim 17 further comprising stand means for locating the assembly on a mounting surface.

26. The magnified mirror assembly of claim 25 wherein the stand means comprise a column extending from the frame and a base disposed at an end of the column which rests on the mounting surface.

27. The magnified mirror assembly of claim 17 wherein the lens is disposed at about 0.01–0.25 inch from the first image reflecting surface.

28. The magnified mirror assembly of claim 17 wherein the frame has an upper portion, a lower portion and means to attach the portions to each other.

29. The magnified mirror assembly of claim 28 wherein the attachment means comprise mating threaded surfaces.

30. The magnified mirror assembly of claim 28 further comprising a shoulder in the lower portion for supporting the lens thereon.

31. The magnified mirror assembly of claim 28 further comprising illumination means disposed on the frame.

32. The magnified mirror assembly of claim 17 wherein the magnifying lens is a bifocal lens.

33. A magnified mirror assembly comprising:
a frame, a first image reflecting surface mounted on said frame and a magnifying lens disposed within said frame and fixedly located adjacent to said image reflecting surface to produce a magnified reflected image, wherein the first image reflecting surface is a magnifying mirror which provides a magnified image reflection, the frame having an upper portion, a lower portion and means to attach the portions to each other, the attachment means comprising mating threaded surfaces.

34. The magnified mirror assembly of claim 33 wherein the lens is disposed at about 0.01–1.0 inch from the first image reflecting surface.

35. The magnified mirror assembly of claim 33 further comprising a handle which extends from the frame.

36. The magnified mirror assembly of claim 33 wherein the frame is made of plastic.

37. The magnified mirror assembly of claim 33 wherein the magnifying lens provides an image magnification power of from 2× to 12×.

38. The magnified mirror assembly of claim 33 wherein the magnifying lens provides an image magnification power of 3×.

39. The magnified mirror assembly of claim 33 wherein the frame has a pair of circumferential grooves, the first image reflecting surface disposed in one groove and the magnifying lens disposed in another groove.

40. The magnified mirror assembly of claim 33 wherein the magnifying lens has one or more increased magnifying portions for providing an increased power of magnification of the reflected image.

41. The magnified mirror assembly of claim 33 further comprising a second image reflecting surface on an opposite side of the first image reflecting surface.

42. The magnified mirror assembly of claim 33 further comprising stand means for locating the assembly on a mounting surface.

43. The magnified mirror assembly of claim 42 wherein the stand means comprise a column extending from the frame and a base disposed at an end of the column which rests on the mounting surface.

44. The magnified mirror assembly of claim 33 wherein the lens is disposed at about 0.01–0.25 inch from the first image reflecting surface.

45. The magnified mirror assembly of claim 33 further comprising a shoulder in the lower portion for supporting the lens thereon.

46. The magnified mirror assembly of claim 33 further comprising illumination means disposed on the frame.

47. The magnified mirror assembly of claim 33 wherein the magnifying lens is a bifocal lens.

48. A magnified mirror assembly comprising: a frame, a first image reflecting surface mounted on said frame and a magnifying lens disposed within said frame and fixedly located adjacent to said image reflecting surface to produce a magnified reflected image, wherein the first image reflecting surface is a magnifying mirror which provides a magnified image reflection, the magnifying lens being a bifocal lens.

49. The magnified mirror assembly of claim 48 wherein the lens is disposed at about 0.01–1.0 inch from the first image reflecting surface.

50. The magnified mirror assembly of claim 49 further comprising stand means for locating the assembly on a mounting surface.

51. The magnified mirror assembly of claim 50 wherein the stand means comprise a column extending from the frame and a base disposed at an end of the column which rests on the mounting surface.

52. The magnified mirror assembly of claim 49 wherein the lens is disposed at about 0.01–0.25 inch from the first image reflecting surface.

53. The magnified mirror assembly of claim. 49 wherein the frame has an upper portion, a lower portion and means to attach the portions to each other.

54. The magnified mirror assembly of claim 53 wherein the attachment means comprise mating threaded surfaces.

55. The magnified mirror assembly of claim 53 further comprising a shoulder in the lower portion for supporting the lens thereon.

56. The magnified mirror assembly of claim 49 further comprising illumination means disposed on the frame.

57. The magnified mirror assembly of claim 48 wherein the frame is made of plastic.

58. The magnified mirror assembly of claim 48 wherein the frame is made of plastic.

59. The magnified mirror assembly of claim 48 wherein the magnifying lens provides an image magnification power of from 2× to 12×.

60. The magnified mirror assembly of claim 48 wherein the magnifying lens provides an image magnification power of 3×.

61. The magnified mirror assembly of claim 48 wherein the frame has a pair of circumferential grooves, the first image reflecting surface disposed in one groove and the magnifying lens disposed in another groove.

62. The magnified mirror assembly of claim 48 wherein the magnifying lens has one or more increased magnifying portions for providing an increased power of magnification of the reflected image.

63. The magnified mirror assembly of claim 48 further comprising a second image reflecting surface on an opposite side of the first image reflecting surface.

* * * * *